United States Patent Office 3,330,854
Patented July 11, 1967

3,330,854
CYCLOPENTADECANE CARBOXYLIC ACID AND ITS LOWER ALKYL ESTERS
Yannik Bonnet, Tassin-la-Demi-Lune, and Gilbert Vivant, Lyon, France, assignors to Rhone-Poulenc S.A., Paris, France, a corporation of France
No Drawing. Filed Jan. 13, 1964, Ser. No. 337,176
Claims priority, application France, Jan. 21, 1963, 922,063/63
2 Claims. (Cl. 260—468)

This invention relates to the preparation of cycloalkane and cycloalkene carboxylic acids and their esters.

According to the present invention, cycloalkane and cycloalkene carboxylic acids and their esters of the formula:

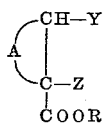   I wherein Y and Z are each hydrogen or together represent a single bond, R is hydrogen or lower alkyl, and A is an alkylene radical containing more than three carbon atoms between the two indicated valence bonds, are prepared by a process which comprises reacting a sulphonic ester of the formula:

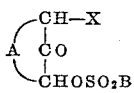   II wherein X represents hydrogen or halogen and B represents a hydrocarbon radical, with an alkali metal hydroxide or alkoxide in an organic or aqueous organic medium.

In Formulae I and II, A preferably represents a polymethylene radical $-(CH_2)_n-$, optionally substituted by one or more lower alkyl, especially methyl, radicals, $n$ being an integer higher than 3, preferably 5 to 16, and B preferably represents a lower alkyl radical or a mononuclear aryl radical, especially phenyl or (lower alkyl) phenyl. By "loweralkyl radicals" is meant herein alkyl radicals having at most 4 carbon atoms: i.e. methyl, ethyl, propyl or butyl.

Some of the compounds of Formula I have heretofore been prepared by the action of alkaline agents (e.g., alkali metal hydroxides or alkoxides in aqueous, organic or aqueous-organic media) on α-halogenated or α,α'-dihalogenated cycloalkanones (the halogen substituents being on ring carbon atoms) themselves obtained by the direct halogenation of cycloalkanones.

In the process of the invention two molecular proportions of the alkali metal hydroxide or alkoxide are used up when X is halogen, and an unsaturated product in which Y and Z together represent a single bond is obtained. On the other hand, when X is hydrogen, only one molecular proportion of the alkali metal hydroxide or alkoxide is used up, and a product in which Y and Z are both hydrogen is obtained.

The compounds of Formula II where X is halogen are obtained from those where X is hydrogen by treatment with a halogen or a halogenation agent.

In the aliphatic series the treatment of α-(toluene-p-sulphonyloxy)-ketones with alkali metal alkoxides gives α-diketones (see Organic Reactions, vol. 11, p. 285), and no esters of alkanoic acids are formed. It is also known that the treatment of toluene-p-sulphonyloxy-6-isophorone with sodium methoxide in solution in methanol gives methyl trimethylcyclopentene carboxylate [A. W. Fort, J. Amer. Chem. Soc., p. 2627 (1962)], but the yields are low and a considerable quantity of methoxyisophorone is simultaneously formed.

It was therefore unexpected that the action of alkali metal hydroxides or alkoxides on sulphonic esters of 2-hydroxycyclo-alkanones containing more than 6 carbon atoms in the ring, and on their α-halogenated derivatives would give rise in good yields to cycloalkane- and cycloalkene-carboxylic acids and their esters containing one carbon atom less in their rings than the initial sulphonic esters.

As the sulphonic ester of Formula II it is generally most convenient to use methanesulphonic (or mesyl) or toluene-p-sulphonic (or tosyl) esters.

As alkali metal hydroxide or alkoxide, it is preferred to use the hydoxides and alkoxides of sodium or potassium. When the operation is carried out with an alkali metal hydroxide, the reaction medium is preferably a lower alkanol, for example methanol, ethanol, propanol or butanol, either in anhydrous form or mixed with water. It is also possible to use other homogeneous aqueous organic mixtures such as mixtures of water and dioxan. The product of the reaction is an alkali metal salt of a carboxylic acid of Formula I, from which the free acid may be liberated by the addition of a mineral acid such as hydrochloric acid. It is preferred to use a molar ratio of alkali metal hydroxide to sulphonic ester of 4–8:1, especially 6:1, and it is especially convenient to use solutions of potassium hydroxide in absolute ethyl alcohol in a concentration of 10% by weight. The reaction, which is conveniently carried out with heating under reflux, lasts several hours, on average from 3 to 6 hours. When it is complete, the excess alcohol is removed, the product is taken up with water and acidified with a mineral acid, and the oily cycloalkane- or cycloalkene-carboxylic acid is extracted with an appropriate organic solvent, for example diethyl ether. The solvent is then evaporated to isolate the acid. These operations do not give rise to any difficulty and are carried out by the conventional methods.

When an alkali metal alkoxide is used in the process of the invention, the reaction medium may be an anhydrous lower alkanol, i.e. methanol, ethanol, propanol or butanol, but is preferably the alcohol corresponding to the alkoxide employed or a non-polar organic liquid, for example a saturated liquid aliphatic or cycloaliphatic hydrocarbon such as heptane, cyclohexane or methylcyclohexane, or a mononuclear aromatic hydrocarbon such as, for example, benzene or toluene, or mixtures of these solvents, more especially mixtures of alcohol and aromatic hydrocarbon. The product of the reaction is an ester of Formula I which can be separated by the application of appropriate known methods.

The acids of Formula I may be converted into the corresponding esters by the application of the known methods of esterification. Alternatively, the esters of Formula I may be converted into the corresponding acids by saponification using the usual methods of saponifying carboxylic acid esters.

When the cycloalkene-carboxylic acids of Formula I exist in stable isomeric forms, treatment of the compound of Formula II with an alkali metal hydroxide in alcoholic or aqueous organic medium leads to one of these forms, while treatment with an alkali metal alkoxide in a non-polar organic medium followed by saponification with an alkali metal hydroxide leads to the other.

The sulphonic esters of Formula II may be prepared from the corresponding 2-hydroxycycloalkanones (or acyloins), which may in turn be obtained in various ways, e.g. by treating esters of aliphatic α,ω-dicarboxylic acids with a molten alkali metal in an inert organic solvent [Stoll, Helv. Chim. Acta 30, 1820 (1947)]. These acyloins are also formed as by-products when cycloalkane-carboxylic acids are prepared by the reaction of alkaline agents with α-halogenated cycloalkanones (see Faworskii, Organic Reactions 11, 292–301). In this case, the process of the invention constitutes a means of utilising the acyloins formed as by-products in the preparation of cycloalkane-carboxylic acids.

The sulphonic esters of Formula II may be made by reacting an acyloin, obtained as just stated, with either a sulphonic acid or a sulphonic acid chloride, for example tosyl chloride or mesyl chloride. The reaction is carried out by treating 1 mol of the acyloin with 1.5 to 2.5 mols of acid chloride, in basic anhydrous organic solvent which is inert under the operating conditions, e.g. pyridine. This esterification is effected in very good yield at ambient temperature (about 20° C.). The keto-ester formed may be extracted from the reaction product with a solvent such as benzene. The tosylates and mesylates obtained after elimination of the extraction solvent are solid crystalline products which can be purified by recrystallisation from various organic solvents, e.g. diethyl ether and petroleum ether.

The halo-esters of Formula II may be prepared by reacting the corresponding unsubstituted keto-esters with a halogen, preferably bromine, in equimolecular quantities, the operation being preferably carried out in an organic solvent medium which is inert under the operating conditions, e.g. a mononuclear aromatic hydrocarbon (such as benzene or toluene) or a halogenoalkane such as carbon tetrachloride. There is thus obtained a mixture of isomeric monohalogenated derivatives, of which the only useful one is that which conforms to Formula II, which is however formed in a preponderant quantity. It is separated from the reaction product, after washing with water and evaporation of the solvent, by extraction with petroleum ether or a mixture of petroleum ether and diethyl ether (50/50), and is then purified by recrystallisation from one of these solvents.

The acids of Formula I may be used as starting materials in organic syntheses, notably in the preparation of esters. Some of these acids and some of their esters with lower alkanols are known. Esters such as methyl cyclopentadecane carboxylate and methyl cycloundecane carboxylate possess very characteristic odours and may be used in perfumery. Others are choleretic agents and may be used in therapeutics.

The following examples illustrate the invention.

*Example 1*

In a 500-cc. spherical flask provided with a reflux condenser, 20.5 g. of 2-oxocyclohexadecyl tosylate are dissolved in 50 cc. of ethanol, and a solution of 16.8 g. of potassium hydroxide in 200 cc. of ethanol is added. The mixture is heated under reflux for 5 hours and the ethanol is then driven off and replaced by 200 cc. of water. After extraction of neutral products with 2× 250 cc. of diethyl ether, the aqueous fraction is acidified by the addition of 50% hydrochloric acid, and the oily phase formed is extracted with 2× 250 cc. of diethyl ether. This ethereal fraction leaves, after drying over anhydrous sodium sulphate followed by elimination of the ether, a crystalline residue weighing 10.5 g., M.P. 52–54° C., which is identified by chemical and infra-red spectrographical analysis as cyclopentadecane-carboxylic acid (yield 84%).

This acid is a new product. On esterification with methanol in the presence of sulphuric acid, it gives methyl cyclopendadecanecarboxylate, B.P. 156–159° C. 1 mm. Hg. This ester has a woody odour and can be used in perfumery.

The sulphonic ester employed as starting material was prepared in the following way. Into a 250-cc. sperical flask are introduced 25.1 g. of cyclohexadecan-2-ol-1-one (prepared by the process described by Stoll Helv. Chim. Acta 30, 1820 (1947)) in solution in 15 cc. of anhydrous pyridine. There are added 37.7 g. of toluene-p-sulphonyl chloride in solution in 75 g. of pyridine, and the flask is then purged with nitrogen and left at ambient temperature for 15 hours. The product is neutralised with 50% hydrochloric acid with cooling. The reaction mass is treated with 3× 150 cc. of benzene and the benzene phase is separated. After elimination of the benzene in vacuo, there is obtained a solid residue which, on recrystallisation from 125 cc. of petroleum ether and then from 150 cc. of methanol and drying at ambient temperature in vacuo (0.5 mm. Hg), gives 26.5 g. of product melting at 64° C., which is identified by chemical analysis and its infra-red spectrum as 2-oxocyclohexadecyl tosylate (yield 65%).

*Example 2*

30.2 g. of 2-oxocyclododecyl tosylate are dissolved in 100 cc. of ethanol, 27 g. of potassium hydroxide in solution in 300 cc. of ethanol are added to this solution and the mixture is heated under reflux for 3 hours. After acidification of the reaction mass, followed by extraction with diethyl ether as in the preceding example, there are obtained 10.5 g. of cycloundecane-carboxylic acid having a boiling point of 118° C. 0.06 mm. Hg (yield 70%).

The sulphonic ester employed as starting material was prepared from 2-hydroxycyclododecanone obtained as by-product, in a yield of 30%, in the preparation of cycloundecanecarboxylic acid from 2-bromo-cyclododecanone by the process described in French patent specification No. 1,264,032. In a 250-cc. spherical flask, 19.8 g. (0.1 mol) of 2-hydroxycyclododecanone are dissolved in 120 cc. of pyridine, 0.2 mol of tosyl chloride is added, and the reaction mass is allowed to stand for 18 hours under a nitrogen atmosphere. By thereafter treating the reaction mass under the same conditions as in the preceding example, there are obtained 30.2 g. of 2-oxocyclododecyl tosylate, M.P. 114° C. (yield 86%).

*Example 3*

By proceeding as in Example 2, but replacing tosyl chloride by an equivalent quantity of mesyl chloride, there are obtained from 15 g. to 2-hydroxycyclododecanone 13 g. of 2-mesyloxy-cyclododecanone, M.P. 108° C. (yield 62%), which on alkaline treatment gives 6.5 g. of cycloundecanecarboxylic acid (yield 71%).

*Example 4*

Into a spherical flask are charged 23.5 g. of 2-bromo-12-tosyloxy-cyclododecanone, 50 cc. of ethanol and a solution of 16.8 g. of potassium hydroxide in 200 cc. of ethanol. The procedure described in Example 1 is then followed, and there are obtained 9.5 g. of crystalline product identified as cycloundec-1-ene carboxylic acid, M.P. 138–139° C. (yield 88%).

The initial bromo ester was prepared in the following manner. Into a 1-litre sperical flask provided with a reflux condenser and a dropping funnel containing 16.75 g. of bromine (0.104 mol), are introduced 36.6 g. (0.104 mol) of 2-oxocyclododecyl tosylate, prepared as described in the preceding example, and 300 cc. of benzene. The mixture is heated under reflux until it is completely dissolved, and a few drops of bromine are then run in. As soon as decolouration occurs, the heating is stopped and the whole of the bromine is slowly added, the mixture being allowed to cool to normal temperature. As soon as the addition has been completed, the product is washed with water and dried over anhydrous sodium sulphate and the benzene is driven off by evaporation. On taking up in petroleum ether and recrystallisation, there are obtained 23.5 g. of 2-bromo-12-tosyloxy-cyclododecanone, M.P. 158° C. (yield 52%).

*Example 5*

To a 100-cc. spherical flask provided with a reflux condenser and containing a solution of 6.2 g. of potassium hydroxide and 65 cc. of ethyl alcohol heated at the reflux temperature are added in portions 6.6 g. of 2-tosyloxy cyclodecanone. The mixture is refluxed for 16 hours. The alcohol is then eliminated, water is added and the reaction mass is extracted with 2× 100 cc. of diethyl ether. The aqueous fraction is then acidified with 20 cc. of concentrated aqueous hydrochloric acid, and the product is extracted with 3× 100 cc. of diethyl ether, and the extracts washed to neutrality with water and dried over sodium sulphate. After elimination of the ether, there remain 2.9 g. of an orange oil, which is cyclononanecarboxylic acid (yield 84.5%).

The 2-tosyloxy-cyclodecanone was prepared in the following manner. To a 250-cc. three-necked spherical flask containing 8.5 g. of cyclodecan-2-ol-1-one and 20 cc. of anhydrous pyridine, maintained at a temperature of 5–10° C., is slowly added a solution of 19 g. of tosyl chloride in 100 cc. of pyridine, and the reaction is allowed to continue for 12 hours at ambient temperature. The reaction mass is then acidified by the slow addition of 150 cc. of concentrated hydrochloric acid, care being taken to maintain the temperature in the neighbourhood of 10° C. by vigorous cooling. The product is extracted with 3× 100 cc. of benzene and the combined benzene extracts are washed with water until they are neutral, and then dried over anhydrous sodium sulphate. By evaporation of the benzene in vacuo, there are obtained 11.1 g. of a residue which, when recrystallized from 40 cc. of petroleum ether and dried, give 6.6 g. of a crystalline product in the form of fine flasks melting at 84–85° C., identified as 2-tosyloxy-cyclodecanone (yield 40%).

*Example 6*

By proceeding as in the preceding example, starting with 4.6 g. of 2-mesyloxy-cyclodecanone, there are obtained 2.55 g. of cyclononane-carboxylic acid (yield 82%) in the form of an orange-coloured oil. The starting ester is obtained from 11.5 g. of methane-sulphonyl chloride and 8.5 g. of cyclodecan-2-ol-1-one in the presence of pyridine, the operation being carried out as in the case of the 2-tosyloxy-cyclodecanone of the preceding example.

*Example 7*

14.8 g. of 2-tosyloxy-cyclooctanone (M.P. 56–58° C.) are dissolved in 50 cc. of ethanol and the solution is heated under reflux for 5 hours with a solution of 16.8 g. of potassium hydroxide in 200 cc. of ethanol. By treating the reaction mass as in Example 1, there are separated 4.4 g. of an oil having a boiling point of 130–132° C. 20 mm. Hg which is cycloheptanecarboxylic acid, identified by gravimetric analysis and infra-red spectography (yield 61.5%).

The starting sulphonic ester is prepared by the action of tosyl chloride in pyridine medium, as described in Example 1, on 17.4 g. of cyclooctan-2-ol-1-one, prepared from methyl octanedioate according to the method of Cope (J. Amer. Chem. Soc., 74, 5886 (1952)).

*Example 8*

In a 250-cc. spherical flask, 1.5 g. of metallic sodium is dissolved in 10 cc. of anhydrous methanol, and the untreated methanol is evaporated. There are then added 80 cc. of benzene and a solution of 17.6 g. of 2-oxo-cyclododecyl tosylate (prepared as in Example 2) in 50 cc. of benzene. The product is heated under reflux for 20 hours and washed with water to eliminate the sodium tosylate. On evaporation of the benzene, there are obtained 9.5 g. of an oil which, on fractional distillation in vacuo, gives 6.5 g. of a fraction, B.P. 84°–86° C./0.7 mm. Hg identified by gravimetric analysis and saponification number as methyl cycloundecane-carboxylate, B.P. 266° C./760 mm. Hg $n_D^{25}=1.4720$, which has a persistent, pleasant, fruity and woody odour and can be used in perfumery By proceeding in the same way, but reacting ethanol instead of methanol with metallic sodium, there was prepared ethyl cycloundecane-carboxylate, B.P. 84°–86° C./0.5 mm. Hg which has an odour similar to that of the methyl ester, and can also be used in perfumery.

*Example 9*

In a 500-cc. spherical flask, 7 g. of metallic sodium are dissolved in 20 cc. of methanol, the excess of methanol is evaporated and the product is then taken up in 150 cc. of benzene. There are then added 54.5 g. of 2-bromo-12-tosyloxy-cyclododecanone (prepared as in Example 4) in solution in 100 cc. of benzene. The product is maintained under reflux for 20 hours, washed with water to eliminate the sodium tosylate formed in the reaction, and concentrated by distillation in vacuo. There is then isolated by fractional distillation a fraction weighing 26 g. which distills at 77–78° C./25 mm. Hg. This fraction, which has a woody and rosy odour, is identified by gravimetric analysis and infra-red spectography as methyl cycloundecene-carboxylate.

*Example 10*

A solution of methyl cycloundecene-carboxylate in benzene is prepared by proceeding as in Example 9. The benzene is then eliminated by distillation, 150 cc. of methanol and 10 g. of sodium hydroxide in solution in 100 cc. of water are added, and the mixture is heated under reflux to saponify the methyl ester. The reaction mass is then worked up as described in Example 4, and there are obtained 24 g. of a cycloundecene-carboxylic acid, M.P. 117° C., which is an isomer of the acid obtained in Example 4.

We claim:
1. Cyclopentadecane carboxylic acid and its lower alkyl esters.
2. Methyl cyclopentadecane carboxylate.

References Cited

UNITED STATES PATENTS 2,878,257    3/1959    Moell et al.
3,085,107    4/1963    Lafont et al. _____ 260—468

LORRAINE A. WEINBERGER, *Primary Examiner.*

R. K. JACKSON, *Assistant Examiner.*